US009706371B2

(12) United States Patent
Kaplinger et al.

(10) Patent No.: US 9,706,371 B2
(45) Date of Patent: *Jul. 11, 2017

(54) PUSH NOTIFICATION MIDDLEWARE (71) Applicant: International Business Machines Corporation, Armonk, NY (US)

(72) Inventors: Todd E. Kaplinger, Raleigh, NC (US); Michael R. Rheinheimer, Cedar Park, TX (US); Brian L. White Eagle, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 309 days.

This patent is subject to a terminal disclaimer.

(21) Appl. No.: 13/948,530

(22) Filed: Jul. 23, 2013

(65) Prior Publication Data
US 2015/0024793 A1 Jan. 22, 2015

Related U.S. Application Data (63) Continuation of application No. 13/945,127, filed on Jul. 18, 2013.

(51) Int. Cl.
*G06F 15/16* (2006.01)
*H04W 4/12* (2009.01)
(Continued)

(52) U.S. Cl.
CPC .............. *H04W 4/12* (2013.01); *H04L 67/26* (2013.01); *H04L 69/08* (2013.01); *H04L 69/18* (2013.01);
(Continued)

(58) Field of Classification Search
CPC ... H04L 12/1895; H04L 12/587; H04L 67/26; H04L 67/303; H04L 67/306; H04L 51/24; H04L 69/08; H04L 69/18
(Continued)

(56) References Cited

U.S. PATENT DOCUMENTS 5,357,510 A * 10/1994 Norizuki et al. .......... 370/236.2
5,473,680 A * 12/1995 Porter ....................... 379/221.15
(Continued)

FOREIGN PATENT DOCUMENTS

CN 102420827 4/2012

OTHER PUBLICATIONS

IP.com, "Intelligent Notification Channel Selector," IP.com No. IPCOM000221942D, Sep. 17, 2012, 3 pages.
(Continued)

*Primary Examiner* — Dhairya A Patel
(74) *Attorney, Agent, or Firm* — Cantor Colburn LLP; Nicholas Bowman (57) ABSTRACT

Embodiments relate to push notification middleware. A method includes receiving, at a notification service of a mobile platform server executing on a computer processor, a notification trigger including a payload to deliver to an endpoint. The method also includes accessing, by the notification service, a registry to determine a notification transport protocol associated with the endpoint. A channel plugin associated with the notification transport protocol is selected by the notification service to establish a notification channel with the endpoint, and the payload is sent to the endpoint on the notification channel.

5 Claims, 5 Drawing Sheets

(51) Int. Cl.
*H04L 29/06* (2006.01)
*H04L 12/18* (2006.01)
*H04L 12/58* (2006.01)
*H04L 29/08* (2006.01)

(52) U.S. Cl.
CPC ........ *H04L 12/1895* (2013.01); *H04L 12/587* (2013.01); *H04L 67/303* (2013.01); *H04L 67/306* (2013.01)

(58) Field of Classification Search
USPC ........ 709/204, 250, 217, 223, 230; 370/235, 370/331, 229, 397; 719/316
See application file for complete search history.

(56) References Cited

U.S. PATENT DOCUMENTS

| | | | |
|---|---|---|---|
| 6,401,099 B1 | 6/2002 | Koppolu et al. | |
| 6,928,051 B2 | 8/2005 | Butt et al. | |
| 7,680,035 B2 | 3/2010 | Krishnan | |
| 7,685,633 B2* | 3/2010 | Ben-Shachar et al. | 726/12 |
| 7,769,046 B1 | 8/2010 | Crocker | |
| 8,023,934 B2 | 9/2011 | Jeide et al. | |
| 8,107,406 B2 | 1/2012 | Huang et al. | |
| 8,144,586 B2 | 3/2012 | McNaughton et al. | |
| 8,219,067 B1 | 7/2012 | Haldar et al. | |
| 8,279,878 B2* | 10/2012 | Takashige et al. | 370/397 |
| 2003/0037335 A1* | 2/2003 | Gatto | H04N 5/76 725/86 |
| 2005/0226430 A1* | 10/2005 | Kreifeldt | H04H 60/04 381/58 |
| 2005/0261923 A1* | 11/2005 | Brown | G06Q 10/10 709/232 |
| 2006/0286993 A1 | 12/2006 | Xie et al. | |
| 2007/0022198 A1 | 1/2007 | Messer et al. | |
| 2007/0106739 A1 | 5/2007 | Clark | |
| 2008/0005188 A1 | 1/2008 | Li et al. | |
| 2009/0204681 A1 | 8/2009 | Sun | |
| 2009/0247134 A1 | 10/2009 | Jeide et al. | |
| 2010/0073160 A1 | 3/2010 | Gilmour et al. | |
| 2010/0241760 A1 | 9/2010 | Zhang et al. | |
| 2010/0257451 A1 | 10/2010 | Halevi et al. | |
| 2010/0268767 A1 | 10/2010 | McColgan et al. | |
| 2011/0040895 A1 | 2/2011 | Griffin et al. | |
| 2011/0060996 A1 | 3/2011 | Alberth, Jr. et al. | |
| 2011/0078318 A1 | 3/2011 | Desai et al. | |
| 2011/0169632 A1 | 7/2011 | Walker et al. | |
| 2011/0173681 A1* | 7/2011 | Qureshi | H04L 63/0823 726/4 |
| 2011/0264778 A1 | 10/2011 | Mcgregor et al. | |
| 2012/0071178 A1 | 3/2012 | Sun et al. | |
| 2012/0173610 A1* | 7/2012 | Bleau | H04L 67/26 709/203 |
| 2012/0179767 A1 | 7/2012 | Clarke et al. | |
| 2012/0198268 A1* | 8/2012 | Qureshi | 714/4.1 |
| 2012/0259918 A1* | 10/2012 | Bringer et al. | 709/204 |
| 2013/0013560 A1 | 1/2013 | Goldberg et al. | |
| 2013/0013804 A1 | 1/2013 | Traynor | |
| 2013/0054706 A1 | 2/2013 | Graham et al. | |
| 2013/0268480 A1 | 10/2013 | Dorman | |
| 2013/0332522 A1 | 12/2013 | Tang et al. | |
| 2013/0332538 A1 | 12/2013 | Clark et al. | |
| 2013/0346521 A1 | 12/2013 | Arabo et al. | |
| 2014/0201289 A1 | 7/2014 | Wheeler et al. | |
| 2014/0337464 A1* | 11/2014 | McGarva et al. | 709/217 |
| 2014/0364103 A1* | 12/2014 | Marti et al. | 455/418 |
| 2015/0019654 A1 | 1/2015 | Wheeler et al. | |
| 2015/0024793 A1 | 1/2015 | Kaplinger et al. | |
| 2015/0024794 A1 | 1/2015 | Kaplinger et al. | |
| 2015/0026237 A1 | 1/2015 | Kaplinger et al. | |
| 2015/0026324 A1 | 1/2015 | Rheinheimer et al. | |
| 2015/0026325 A1 | 1/2015 | Rheinheimer et al. | |
| 2015/0026356 A1 | 1/2015 | Kaplinger et al. | |

OTHER PUBLICATIONS

Mahesh Sooriyabandara et. al., Unified Link Layer API: A generic and open API to manage wireless media access, Computer Communications, v 31, n. 5, p. 962-979, Mar. 25, 2008, Elsevier.

* cited by examiner

PUSH NOTIFICATION MIDDLEWARE

CROSS-REFERENCE TO RELATED APPLICATIONS

This application is a continuation of U.S. patent application Ser. No. 13/945,127, filed Jul. 18, 2013, entitled "PUSH NOTIFICATION MIDDLEWARE," which is hereby incorporated by reference in its entirety.

BACKGROUND

The present disclosure relates to communication interfaces and, more specifically, to push notification middleware in a mobile communication environment.

The prevalence of mobile smart devices has driven many changes in the way clients and servers communicate. Some of the changes include new client/server application models and new types of notification mechanisms. Push notification forwards notifications from application servers to mobile devices. Notifications can include various types of data, audio, or text alerts. In contrast, pull technology is based on requests initiated by mobile devices. Push notification can improve battery life of mobile devices as compared to greater power consumption of background processes typically running to support pull technology.

To support push notification, mobile devices can include logic running outside of the client. The logic may trigger some action on the client via a notification. When a notification is received on the client, the specified action may require the client to connect to an application server to retrieve or take further action on the awaiting information. A variety of platform-specific push notification transport protocols have been developed, including Apple™ Push Notification Service (APNs), Google™ Cloud Messaging (GCM), Short Message Service (SMS), and other proprietary protocols.

As applications are written that interface an application server to a variety of mobile devices, it can be challenging to handle the diverse body of notification mechanisms for compatibility across the various mobile devices. The challenges are further enhanced for application developers who are knowledgeable about application server environments but are not experts in mobile technology.

SUMMARY

According to an embodiment, a method for push notification middleware is provided. The method includes receiving, at a notification service of a mobile platform server executing on a computer processor, a notification trigger including a payload to deliver to an endpoint. The method also includes accessing, by the notification service, a registry to determine a notification transport protocol associated with the endpoint. A channel plugin associated with the notification transport protocol is selected by the notification service to establish a notification channel with the endpoint, and the payload is sent to the endpoint on the notification channel.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to push notification middleware in a mobile communication environment. The push notification middleware provides a notification framework that is dynamic and supports registering and un-registering of notification channels and endpoints. Notification channels may be defined to support a variety of notification transport protocols. Endpoints are targeted recipients of push notifications. The push notification middleware is pluggable to support multiple notification transport protocols which can be modified over time. The push notification middleware is optimized for a mobile communication environment, where notification delivery is not guaranteed and expected to have low latency. In exemplary embodiments, an application programming interface (API) is exposed by the push notification middleware for simple message delivery, where a notification transport protocol and target device(s) need not be known by the API caller. The API for simple message delivery is extensible and therefore capable of receiving additional metadata to support modifications and additions to the notification transport protocols.

The push notification middleware may provide push notification based on triggers and/or topic publishing. Exemplary embodiments support loose coupling of triggering and delivery, where a notification channel for push notification delivery need not be known by a triggering entity. Loose coupling simplifies the API for triggering. For example, a trigger may only include an application and a user. The pluggable framework enables support for new notification channels to be added over time with no changes to a trigger API. Loose coupling may reduce changes needed within the push notification middleware and isolates changes to the plugins. The push notification middleware may also include one or more APIs to optionally add advanced interfaces, such as publish/subscribe support. APIs of the push notification middleware can be defined at a high level such that additional functions can use the same APIs that external applications use. Common APIs for internal and external interfacing with the push notification middleware can result in more reliable and better tested APIs, as well as freedom to provide software that is "fit for function".

Figure 1:
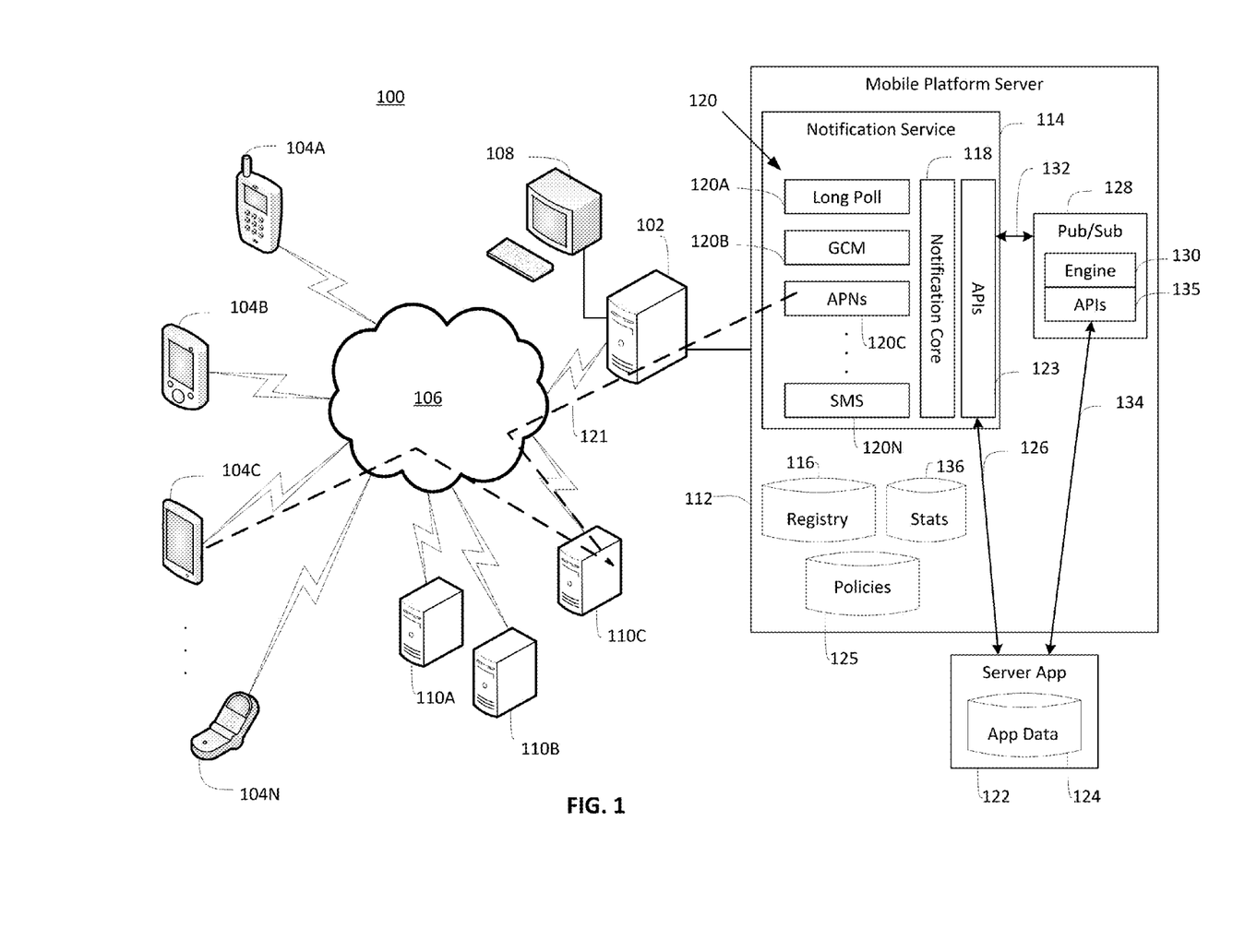
FIG. 1 depicts a block diagram of a system upon which push notification may be implemented according to an embodiment.

Turning now to FIG. 1, an example of a system 100 upon which push notification may be implemented will now be described in greater detail. The system 100 represents a mobile communication environment. In the example depicted in FIG. 1, the system 100 includes a server system 102 configured to communicate with one or more mobile devices 104A-N over a communication network 106. In exemplary embodiments, the server system 102 is a high-speed processing device (e.g., a mainframe computer, a desktop computer, a laptop computer, a hand-held device, an embedded computing device, or the like) including at least one processing circuit (e.g., a computer processor/CPU) capable of reading and executing instructions, and handling interactions with various components of the system 100.

In exemplary embodiments, the mobile devices 104A-N, each generally referred to as a mobile device 104, can include a variety of mobile handsets and mobile computing devices with processing circuits and I/O interfaces, such as a keys/buttons, a touchscreen, audio input, a display device and audio output. In the example depicted in FIG. 1, the mobile devices 104A-N support push notification using a variety of notification transport protocols. The server system 102 and mobile devices 104A-N can include various computer/communication hardware and software technology known in the art, such as one or more processing units or circuits, volatile and non-volatile memory including removable media, power supplies, network interfaces, support circuitry, operating systems, and the like. The server system 102 may also include one or more user interfaces 108 with user accessible I/O devices, such as a keyboard, mouse, and display.

The communication network 106 may be any type of communications network known in the art. The communication network 106 can include a combination of wireless, wired, and/or fiber optic links. The communication network 106 may support a variety of known communication standards that allow data to be transmitted wirelessly between the server system 102 and the mobile devices 104A-N. Additional computer systems, such as gateways 110A, 110B, and 110C, may also interface with the server system 102 and the mobile devices 104A-N via the communication network 106 or other networks. The gateways 110A-110C may provide protocol conversion and implementation-specific support as needed between the server system 102 and one or more of the mobile devices 104A-N.

In exemplary embodiments, the server system 102 includes a mobile platform server 112, which is an example of push notification middleware. The mobile platform server 112 includes a notification service 114 and a registry 116. The notification service 114 includes a notification core 118 that interfaces with a plurality of channel plugins 120. The notification core 118 is pluggable to support multiple notification transport protocols as defined via the channel plugins 120. Each of the channel plugins 120 may support a particular notification transport protocol. In the example of FIG. 1, channel plugin 120A is a customized notification transport protocol referred to as Long Poll. Channel plugin 120B supports Google™ Cloud Messaging (GCM), channel plugin 120C supports Apple™ Push Notification Service (APNs), and channel plugin 120N supports Short Message Service (SMS). Each of the channel plugins 120 can be used to establish channels for push notification to the mobile devices 104A-N. In some cases, various gateways 110A-C are used to establish notification channels with the mobile devices 104A-N. For example, gateway 110A may be a GCM gateway, gateway 110B may be an SMS server, and gateway 110C may be an APNs gateway. It will be understood that additional or fewer gateways 110 and channel plugins 120 can be supported in embodiments. An example of a notification channel 121 is depicted in FIG. 1 that is established between channel plugin 120C associated with the APNs notification transport protocol to send a notification trigger with a payload between the notification service 114, gateway 110C, and mobile device 104C in this example.

In the example of FIG. 1, the Long Poll notification transport protocol of channel plugin 120A enables push notification on mobile devices 104A-N that may not otherwise have an existing notification transport protocol defined, e.g., legacy mobile devices. The Long Poll notification transport protocol and other notification transport protocols may support direct push notification to mobile devices 104A-N rather than involving one of the gateways 110A-C.

In exemplary embodiments, the notification service 114 uses the registry 116 to track relationships between applications, users, and the mobile devices 104A-N for push notification. The registry 116 can also coordinate which notification transport protocol and channel plugin 120 is associated with a particular endpoint. An endpoint, or notification endpoint, can be defined at a device level, e.g., one of the mobile devices 104A-N, or at an application level, such as a particular application instance executing on one of the mobile devices 104A-N. Accordingly, each of the mobile devices 104A-N can have more than one endpoint defined in the registry 116.

The mobile platform server 112 may also include policies 125 for push notification. The notification service 114 can be configured to give preference to particular notification channels based on the policies 125. The policies 125 may support a variety of arbitrary configurations to support various combinations of channel plugins 120, mobile devices 104A-N, and/or gateways 110A-110C. The policies 125 can be modified by an administrator of the mobile platform server 112 to establish priorities and rules for the notification channels. For example, if multiple notification channels are possible, some notification channels may be prioritized above others according to the policies 125. Alternatively, notification may be sent on all channels if a channel unique identifier is not specified in a notification trigger.

The notification service 114 supports calls to notification service APIs 123 from application servers, such as server app 122, to trigger notifications which are mapped through the registry 116 to one or more endpoints and sent as push notifications. The server app 122 may define a payload of data based on app data 124 to be sent through the mobile platform server 112 to an endpoint, such as one or more of the mobile devices 104A-N. A communication path 126 enables the server app 122 to trigger notifications via API calls to the notification service 114.

The mobile platform server 112 may also include a publish/subscribe (pub/sub) component 128. The pub/sub component 128 includes an engine 130 that enables a client to subscribe to a topic and another entity to publish to the topic. For example, application instances on two or more of the mobile devices 104A-N may subscribe to the same topic. Rather than sending data for the topic individually to the notification service 114, the server app 122 can send a payload for the topic to the pub/sub component 128 which in turn sends notification triggers to the notification service 114. A communication path 132 enables the pub/sub component 128 to trigger notifications via calls to the notification service APIs 123 of the notification service 114, and a communication path 134 enables the server app 122 to publish to topics via calls to pub/sub APIs 135 of the pub/sub component 128. The pub/sub component 128 enables notification consumers and publishers to be loosely coupled.

The mobile platform server 112 may also support generation and tracking of various statistics associated with push notification. Statistics associated with push notification can be stored in a statistics data store 136 of the mobile platform server 112. For example, the statistics data store 136 can keep statistics on: trigger success/failure; triggers by user, application, channels, and endpoints; and topic publish to endpoint mappings. This data can be accumulated over time in the statistics data store 136 to demonstrate trends.

Figure 2:
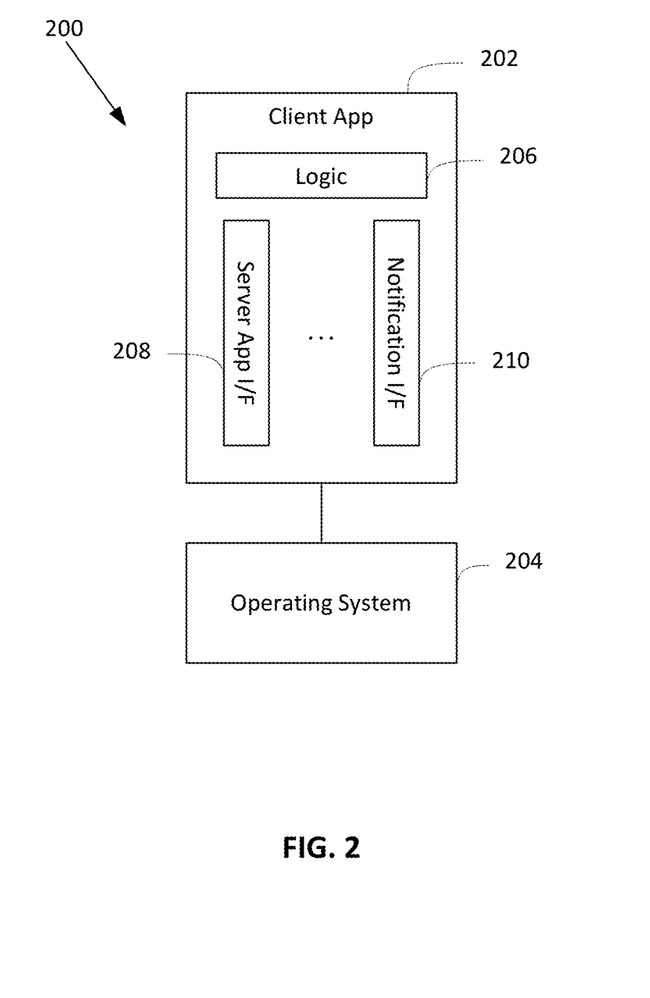
FIG. 2 depicts an example client device for push notification according to an embodiment.

FIG. 2 depicts an example of a client device 200 for push notification according to an embodiment. The client device 200 is an example of one of the mobile devices 104A-N of FIG. 1. The client device 200 includes a client application 202 that interfaces to an operating system 204. The client application 202 includes logic 206 that interacts with a number of modules, such as a server application interface 208 and a notification interface 210. The notification interface 210 is configured to identify and react to notifications from the notification service 114. The server application interface 208 is configured to utilize content in the payload data sent by the server app 122 of FIG. 1 as part of a notification. The notification interface 210 interprets particular notification transport protocols over channels established through the channel plugins 120 of FIG. 1. For example, if the device 200 is an Apple™ device, the operating system 204 may be an iOS™ operating system, and the notification interface 210 can be an APNs interface that is compatible with the APNs channel plugin 120C of FIG. 1. Alternatively, if the device 200 is an Android™ device, the operating system 204 may be an Android™ operating system, and the notification interface 210 can be a GCM interface that is compatible with the GCM channel plugin 120B of FIG. 1.

Figure 3A:
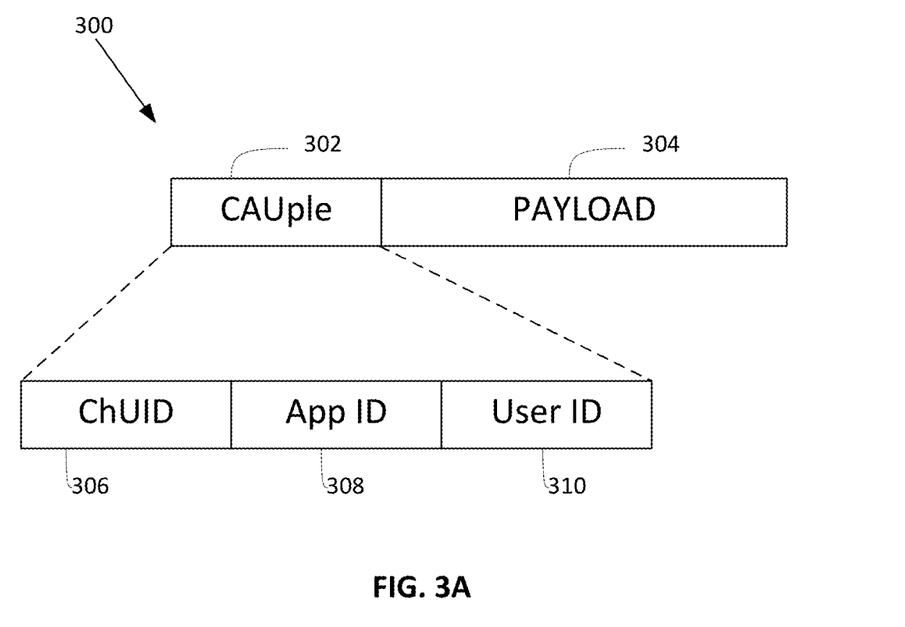
FIG. 3A depicts an example of a notification trigger format according to an embodiment.

FIG. 3A depicts an example of a notification trigger format 300 according to an embodiment. In the embodiment of FIG. 3A, the notification trigger format 300 includes a channel-application-user ID tuple (CAUple) 302 and a payload 304. The CAUple 302 may include a combination of a channel unique identifier (ChUID) 306, an application identifier (App ID) 308, and a user identifier (User ID) 310. The ChUID 306 uniquely identifies an endpoint for a specific channel. The ChUID 306 may be a device ID. For example, where the notification transport protocol is Long Poll, the ChUID 306 is the device ID. The ChUID 306 for an SMS channel may be a phone number of the endpoint. To support loose coupling, a specific value for the ChUID 306 may be omitted or defined as a wildcard such that a triggering entity need not know specific device details and instead relies upon a lookup by the notification service 114 into the registry 116 for channel endpoints. The payload 304 is the content to be delivered to an endpoint, which may be a short text string. Triggers according to the notification trigger format 300 may be sent on the communication paths 126 and 132 of FIG. 1.

Figure 3B:
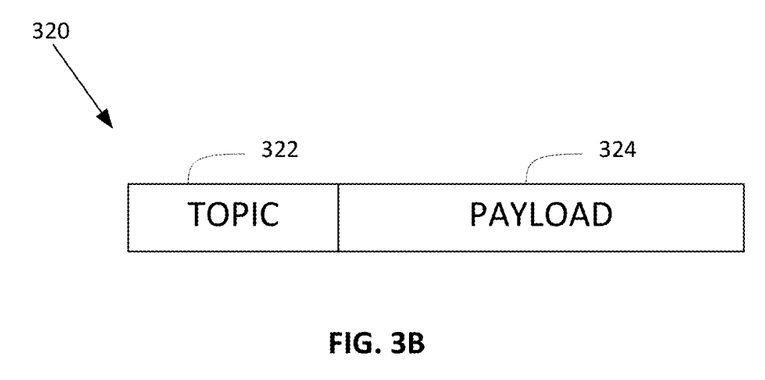
FIG. 3B depicts an example of a publish request format according to an embodiment.

FIG. 3B depicts an example of a publish request format 320 according to an embodiment. In exemplary embodiments, the publish request format 320 includes a topic 322 and a payload 324. The topic 322 provides an identifier for the grouping of subscribe and publish requests at the pub/sub component 128 of FIG. 1. Each topic 322 may be a string. A topic need not preexist before a subscription. Similar to payload 304 of FIG. 3A, the payload 324 of FIG. 3B is the content to be delivered to one or more endpoints, which may be a short text string. Topic publishing according to the publish request format 320 may be sent on communication path 134 of FIG. 1. Publishing sends the payload 324 to all subscribers of the particular topic 322.

Figure 4:
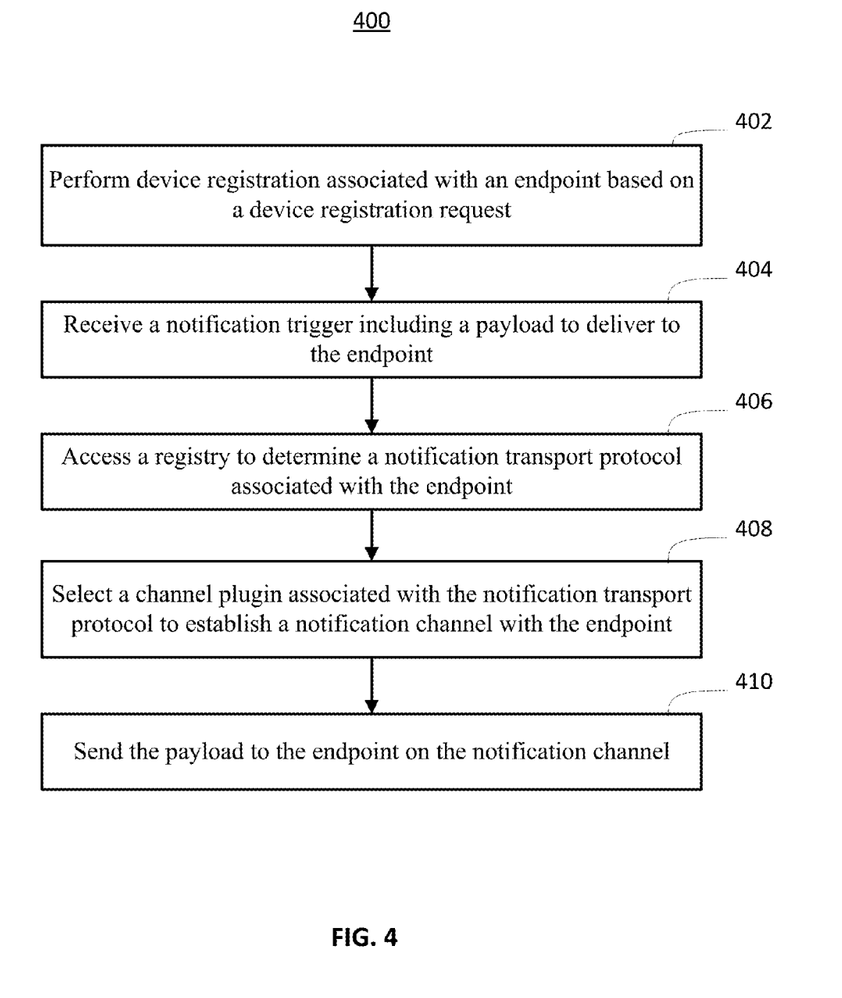
FIG. 4 depicts a flow diagram of a process for push notification according to an embodiment.

Turning now to FIG. 4, a process 400 for push notification will be described in accordance with an exemplary embodiment. The process 400 is described in reference to FIGS. 1-4 and can be implemented by the server system 102 of FIG. 1.

At block 402, the notification service 114 performs device registration associated with an endpoint based on a device registration request. Device registration may include recording a channel unique identifier, an application identifier, and a user identifier in the registry 116. Additional data or metadata may be provided as part of registration to assist in payload delivery. Channel specific data for delivery, such as a token, may be stored in the registry 116. Registration is the act of registering an endpoint to receive push notifications. A device may register from its endpoint or via another interface (e.g., a webpage) depending on channel implementation. A RESTful command (i.e., representational state transfer (REST) based communications) can be used to provide a device token for delivery by one of the gateways 110A-110C along with an application identifier. Another channel, such as SMS, may register the endpoint via a web page and provide an application identifier, a user identifier, and a channel unique identifier (e.g., phone number). Once an endpoint has been registered, the notification service 114 will attempt to deliver a push notification to the endpoint if a notification trigger identifies the endpoint as the target.

A third-party server application, such as server app 122, may decide to notify an endpoint when new data are available. To do so, the server app 122 can submit a notification trigger as a RESTful request that includes the CAUple 302 and payload 304 of FIG. 3A to the notification service 114.

At block 404, a notification trigger is received that includes a payload to deliver to an endpoint, where the endpoint may be a device or application instance on one of the mobile devices 104A-N. The notification trigger may identify an endpoint using a tuple, such as CAUple 302 of FIG. 3A, with a channel unique identifier, an application identifier, and a user identifier. The notification service 114 is further configured to access the registry 116 to determine a value for the channel unique identifier based on an omission of a specific value for the channel unique identifier in the notification trigger.

At block 406, the registry 116 is accessed to determine a notification transport protocol associated with the endpoint. At block 408, a channel plugin 120 is selected associated with the notification transport protocol to establish a notification channel with the endpoint, such as notification channel 121. The notification service 114 includes the notification core 118 that is configured to interface with a plurality of channel plugins 120 associated a plurality of notification transport protocols from which a particular channel plugin is selected. The notification channel may be established between the notification service 114 and the endpoint through a gateway, such as one of the gateways 110A-110C. Accordingly, the device registration of block 402 may also include recording a device token for delivery through the gateway.

At block 410, the payload is sent to the endpoint on the notification channel. The notification service 114 may be further configured to generate and track statistics associated with push notification in the statistics data store 136.

As previously described, the notification service 114 is accessible by a number of components and/or applications. The notification service API 123 may be accessible by both the pub/sub component 128 and application server(s) external to the mobile platform server 112, such as the server app 122. The notification service API 123 is configured to receive the notification trigger of block 404. The pub/sub component 128 includes pub/sub APIs 135 that are accessible by the server app 122 to publish to one or more topics and provide push notifications to a plurality of subscribed endpoints. Registered endpoints, as tracked in the registry 116, can subscribe to a topic by providing respective CAUples and the topic name. CAUples can be tracked by the pub/sub component 128 to map topic subscribers to CAUples. Subscribing can be performed from the respective endpoint or via another mechanism (e.g., webpage). Multiple endpoints of a same or different user can subscribe to the same topic. A subscription request can be made as a RESTful request.

The pub/sub component 128 is further configured to convert publish requests into notification triggers for each of the subscribed endpoints and send the notification triggers to the notification service API 123. A third party server application may publish a payload to a topic by sending a publish RESTful request to the pub/sub component 128 which includes the topic name and payload to be sent, for instance according to the publish request format 320 of FIG. 3B. The payload may include variables that can change depending on the endpoint, such as "USERNAME" or "OUTSTANDING BILL".

Figure 5:
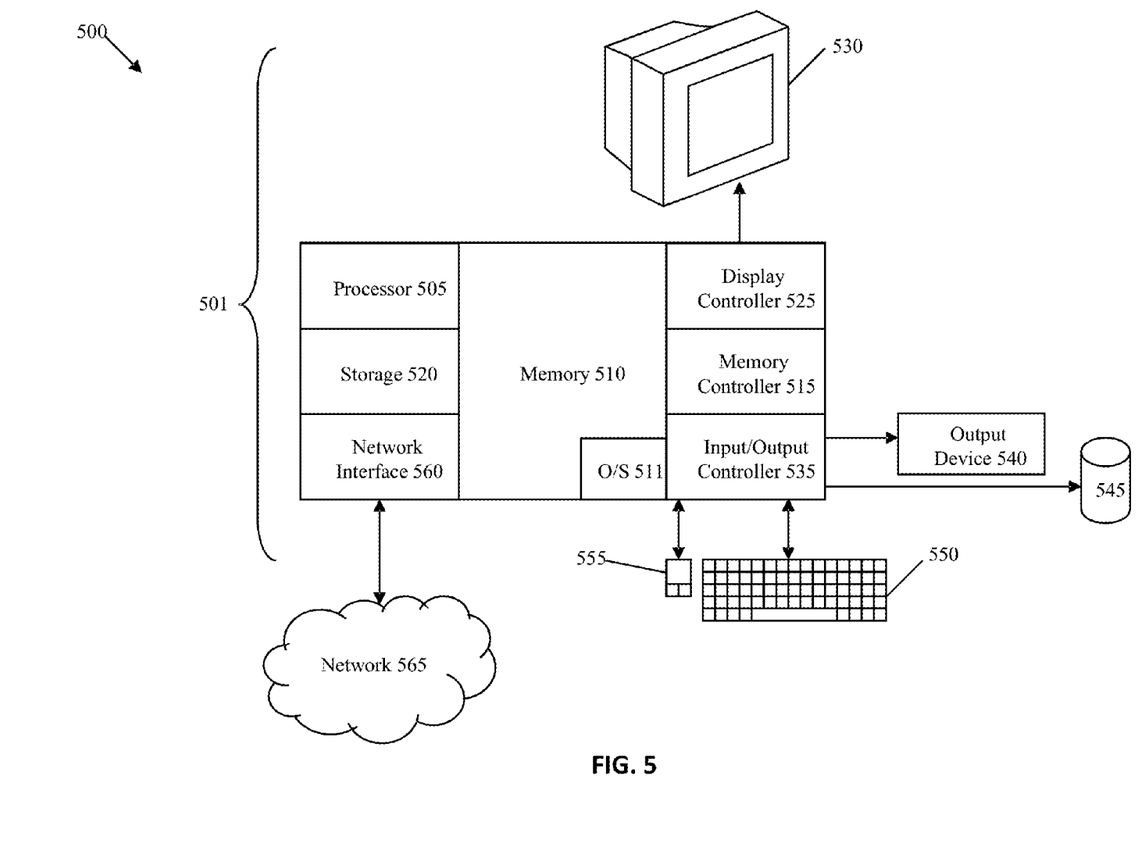
FIG. 5 depicts a further example of a block diagram of a system for push notification.

FIG. 5 illustrates a block diagram of a system 500 for push notification. The processes as previously described can be implemented in system 500 in hardware, software (e.g., firmware), or a combination thereof as part of a special or general-purpose digital computer, such as a personal computer, workstation, minicomputer, or mainframe computer. The system 500 therefore includes general-purpose computer 501 as illustrated in FIG. 5. The system 500 is a further example of the system 100 of FIG. 1, where the general-purpose computer 501 is an embodiment of the server system 102 of FIG. 1.

In an exemplary embodiment, in terms of hardware architecture, as shown in FIG. 5, the computer 501 includes a computer processor 505 and memory 510 coupled to a memory controller 515, and one or more input and/or output (I/O) devices 540, 545 (or peripherals) that are communicatively coupled via a local input/output controller 535. The input/output controller 535 can be, for example but not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The computer processor 505 is a processing device for executing software, particularly software stored in storage 520, such as cache storage, or memory 510. The computer processor 505 can be any custom made or commercially available computer processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the computer processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially controls the execution of other computer programs and provides scheduling, input-output control, file and data management, memory management, and communication control and related services.

In an exemplary embodiment, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530. In an exemplary embodiment, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In an exemplary embodiment, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the instructions in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the computer processor 505 is configured to execute instructions stored within the memory 510, to communicate data to and from the memory 510, and to generally control operations of the computer 501 pursuant to the instructions.

Technical effects include providing push notification middleware to map push notifications through channel plugins and simplify interfacing between applications and various devices/endpoints.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:

1. A method comprising:
   performing device registration by recording one or more of: a channel unique identifier, an application identifier, and a user identifier in a registry based on receiving a device registration request;
   receiving, at a notification service of a mobile platform server executing on a computer processor, a notification trigger comprising a payload to deliver to an endpoint, wherein the notification trigger further comprises a tuple including one or more of: the channel unique identifier, the application identifier, and the user identifier, wherein the channel unique identifier is defined as a wildcard indicating device details associated with the endpoint are unknown;
   accessing, by the notification service, the registry to determine a notification transport protocol associated with the endpoint and to determine a value for the channel unique identifier as lookup operation based on an omission of a specific value for the channel unique identifier in the notification trigger;
   selecting, by the notification service, a channel plugin associated with the notification transport protocol to establish a notification channel with the endpoint;
   sending the payload to the endpoint on the notification channel; and
   providing a notification service application programming interface (API) that is accessible by both a publish/subscribe component and an application server, the notification service API configured to receive the notification trigger, wherein the publish/subscribe component further comprises publish/subscribe APIs accessible by the application server to publish to one or more topics and provide push notifications to a plurality of subscribed endpoints, and the publish/subscribe component is further configured to convert publish requests into notification triggers for each of the subscribed endpoints and send the notification triggers to the notification service API.

2. The method of claim 1, further comprising:
   interfacing with a plurality of channel plugins associated a plurality of notification transport protocols from which the channel plugin is selected.

3. The method of claim 1, wherein the notification channel is established between the notification service and the endpoint through a gateway, and the device registration further comprises recording a device token for delivery through the gateway.

4. The method of claim 1, further comprising:
   providing policies for push notification; and
   giving preference to particular notification channels based on the policies.

5. The method of claim 1, further comprising:
   generating and tracking statistics associated with push notification.

* * * * *